(12) United States Patent
Walsh et al.

(10) Patent No.: US 11,593,754 B2
(45) Date of Patent: Feb. 28, 2023

(54) SUPPLY KNOWLEDGE PORTAL SYSTEMS AND METHODS

(71) Applicant: CareFusion 303, Inc., San Diego, CA (US)

(72) Inventors: Mathew Walsh, San Diego, CA (US); John Mueller, San Diego, CA (US); Alex Alonzo, San Diego, CA (US); Roman Rodriguez, San Diego, CA (US); Alexander Day, San Diego, CA (US)

(73) Assignee: CAREFUSION 303, INC., San Diego, CA (US)

( * ) Notice: Subject to any disclaimer, the term of this patent is extended or adjusted under 35 U.S.C. 154(b) by 225 days.

(21) Appl. No.: 16/041,625

(22) Filed: Jul. 20, 2018

(65) Prior Publication Data

US 2019/0087770 A1 Mar. 21, 2019

Related U.S. Application Data

(60) Provisional application No. 62/535,791, filed on Jul. 21, 2017.

(51) Int. Cl.
*G06Q 10/08* (2012.01)
*G06Q 10/087* (2023.01)
*G06F 16/34* (2019.01)
*G06F 16/22* (2019.01)
*G06F 16/242* (2019.01)

(52) U.S. Cl.
CPC ....... *G06Q 10/087* (2013.01); *G06F 16/2282* (2019.01); *G06F 16/244* (2019.01); *G06F 16/345* (2019.01)

(58) Field of Classification Search
CPC . G06Q 10/087; G06F 16/2282; G06F 16/244; G06F 16/345
See application file for complete search history.

(56) References Cited

U.S. PATENT DOCUMENTS

| | | | |
|---|---|---|---|
| 8,099,339 B1* | 1/2012 | Pinsonneault | G16H 40/20 705/28 |
| 2006/0071774 A1* | 4/2006 | Brown | G07F 9/026 340/522 |
| 2007/0208598 A1* | 9/2007 | McGrady | G16H 15/00 705/3 |
| 2008/0077358 A1* | 3/2008 | Marvasti | G06N 20/00 702/187 |
| 2009/0070404 A1* | 3/2009 | Mazzaferri | G06F 3/0484 709/202 |
| 2009/0101708 A1* | 4/2009 | Kochevar | G06Q 50/26 235/382 |

(Continued)

*Primary Examiner* — Ashish Thomas
*Assistant Examiner* — Dustin D Eyers
(74) *Attorney, Agent, or Firm* — Morgan, Lewis & Bockius LLP

(57) ABSTRACT

Systems and methods are provided for a supply knowledge portal. The supply knowledge portal provides a new metric dashboard that delivers real-time information on the status and health of the hospital supply chain. The new dashboard is driven by the transactional data generated from system point of use devices and allows end users to view data at various levels starting at the facility level and moving down to filter for specific areas, devices and, at the lowest level, items.

20 Claims, 12 Drawing Sheets

(56) References Cited

U.S. PATENT DOCUMENTS

| | | | | |
|---|---|---|---|---|
| 2012/0206243 A1* | 8/2012 | Butler | ............... | H01Q 1/2225 340/10.51 |
| 2014/0149133 A1* | 5/2014 | Gibby | ............ | G06Q 10/063114 705/2 |
| 2014/0280373 A1* | 9/2014 | Raitto | ............... | G06F 16/24542 707/803 |
| 2016/0103918 A1* | 4/2016 | Alekseyev | .......... | G06F 16/2428 715/810 |

* cited by examiner

SUPPLY KNOWLEDGE PORTAL SYSTEMS AND METHODS

CROSS-REFERENCE TO RELATED APPLICATIONS

The present application is a continuation of U.S. application Ser. No. 16/984,000, entitled "AUTOMATIC ASSOCIATION OF MEDICAL ELEMENTS," filed on Aug. 3, 2020, now U.S. Pat. No. 11,152,113, which is a continuation application of U.S. application Ser. No. 16/506,914, entitled "AUTOMATIC ASSOCIATION OF MEDICAL ELEMENTS," filed on Jul. 9, 2019, now U.S. Pat. No. 10,755,807, which is a continuation application of U.S. application Ser. No. 15/934,867, entitled "AUTOMATIC ASSOCIATION OF MEDICAL ELEMENTS," filed on Mar. 23, 2018, now U.S. Pat. No. 10,347,375, which is a continuation application of U.S. application Serial No. 14/337,151, entitled "AUTOMATIC ASSOCIATION OF MEDICAL ELEMENTS," filed on Jul. 21, 2014, now U.S. Pat. No. 9,946,837, which is a continuation of U.S. application Ser. No. 12/890,447, entitled "AUTOMATIC ASSOCIATION OF MEDICAL ELEMENTS," filed on Sep. 24, 2010, now U.S. Pat. No. 8,786,402, the entirety of each of which is incorporated herein by reference.

TECHNICAL FIELD

The present disclosure generally relates to supply chains, and more particularly to supply knowledge portal systems and methods for supply chains.

BACKGROUND

Point-of-use devices in a supply chain, such as electronic supply cabinets, can allow controlled and monitored access to items in the supply chain and track transactions at the point-of-use, such as addition or removal of items to or from the point-of-use device. Tracking information for these transactions can be stored, per transaction, for a system of point-of-use devices, in a large database. These databases can allow bulk download of the transaction information for generation of reports by end users. However, the transaction-based storage of the tracking information requires massive databases for storage and is inefficient for storing, updating, and accessing the information.

SUMMARY

A supply knowledge portal is provided by which a user can access information associated with a supply chain. The supply knowledge portal provides a metric dashboard that delivers information on the status and health of the hospital supply chain. The metric dashboard is driven by transactional data generated from the system point-of-use devices and provided to a database server. The database server includes a repository of time-based information and an analysis server that generates data structures with values for each of several metrics associated with the supply chain. These data structures with pre-computed values provide quick access to supply chain information and, via the supply knowledge portal, allow end users to view data at various levels starting at, for example, a facility level and moving down to filter for specific areas, devices and, at the lowest level, items in the supply chain.

The generation and arrangement of data structures described herein more effectively and efficiently provides access to supply chain information from a system of network-connected point-of-use devices than traditional database models.

In accordance with various aspects of the present disclosure. A system is provided that includes a database server and one or more point-of-use devices in a hospital supply chain, each configured to provide controlled access to medical items and to provide information associated with the medical items to the database server via a network. The database server includes a memory that stores at least one metric value for a plurality of metrics for the hospital supply chain. The at least one metric value for each metric is generated, based on at least a portion of the information associated with the medical items, at a corresponding partition of an analysis database of the database server. The system also includes a web server configured to facilitate user access to the stored metric values via a metric dashboard of a user interface.

In accordance with other aspects, a method is provided that includes tracking, with one or more point-of-use devices in a hospital supply chain, controlled access events associated with medical items. The method also includes providing information associated with the medical items to a database server via a network. The method also includes generating at least one metric value for a plurality of metrics for the hospital supply chain, based on at least a portion of the information associated with the medical items, at a corresponding partition of an analysis database of the database server. The method also includes providing, with a web server, user access to the at least one metric value for the plurality of metrics via a metric dashboard of a user interface.

In accordance with other aspects, a database server associated with at least one hospital is provided, the database server including an import database storing information from a plurality of point-of-use devices in a hospital supply chain, a repository database storing relational data associated with the information from the plurality of point-of-use devices, an analysis database that includes a plurality of partitions, each configured to compute a metric of the hospital supply chain using the relational data in the repository database to provide efficient access to the metric via a metric dashboard provided at a user device that is remote from the database server.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure, it will be apparent, however, to one ordinarily skilled in the art that embodiments of the present disclosure may be practiced without some of the specific details. In other instances, well-known structures and techniques have not been shown in detail so as not to obscure the disclosure. In the referenced drawings, like numbered elements are the same or essentially similar. Reference numbers may have letter suffixes appended to indicate separate instances of a common element while being referred to generically by the same number without a suffix letter.

Figure 1:
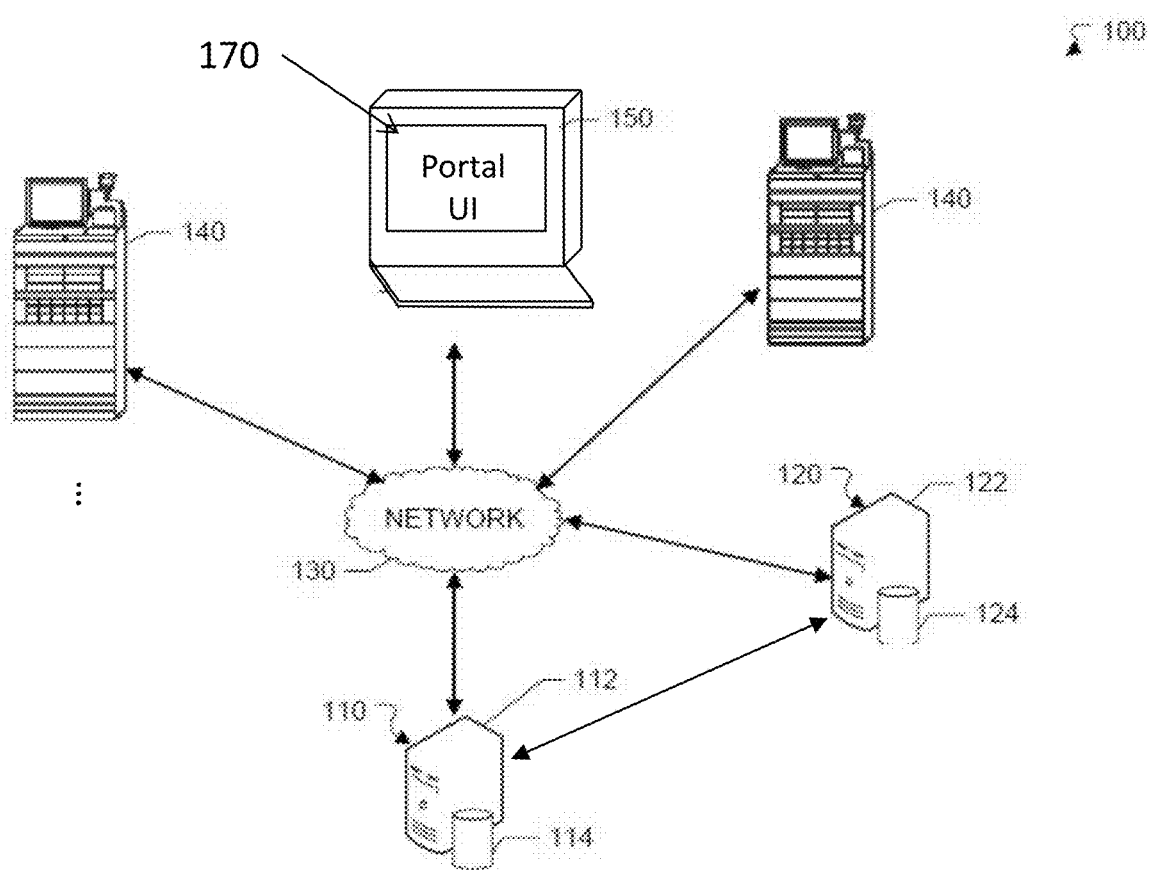
FIG. 1 illustrates an example system in which a supply knowledge portal may be implemented in accordance with one or more aspects of the disclosure.

FIG. 1 illustrates an example system 100 in which a supply knowledge portal may be implemented in accordance with one or more embodiments. Not all of the depicted components may be required, however, and one or more embodiments may include additional components not shown in the figure. Variations in the arrangement and type of the components may be made without departing from the spirit or scope of the claims as set forth herein. Additional, different or fewer components may be provided.

System 100 may be a hospital network, a network associated with a portion of a hospital or other healthcare facility, a network that includes multiple hospitals and/or other healthcare facilities. System 100 may include a number of medical devices, such as one or more point-of-use devices 140, that may be communicably coupled to one another and to one or more of a database server 110 and/or a web server 120, such as by the network 130. As shown in FIG. 1, system 100 may also include one or more user devices 150 by which an end user may access a portal user interface 170 of the supply knowledge portal provided by database server 110 (e.g., an interface to the database server as provided by or facilitated by web server 120). In addition, there may be a number of other devices connected to the network 130, such as additional medical devices, additional servers, computing devices, mobile devices, etc.

Point-of-use devices 140 may be devices that provide controlled and/or monitored access to items such as medications, surgical supplies, first-aid supplies, or the like. For example, one or more of point-of-use devices 140 may be a medication dispensing device. One example of a suitable medication dispensing device is the BD Pyxis MedStation™ available from Becton, Dickinson and Company of Franklin Lakes, N.J., which provides automated dispensing system for medications and/or other medical supplies such as surgical tools supports decentralized medication management with various features for safety and efficiency. Medication dispensing devices and/or other point-of-use devices help accurately dispense medication and/or other hospital items, while supporting pharmacy workflows and supply chain management.

The one or more point-of-use devices 140 may be devices that store and dispense medications, such as at a nurse's station. In one or more implementations, one or more of the point-of-use device 140 may be waste devices that accept and store wasted medications, e.g., excess medications, from healthcare professionals and track the amount of medications wasted by healthcare professionals such as a Pyxis EcoStation™ system available from Becton, Dickinson and Company of Franklin Lakes, N.J.

One or more of the point-of-use devices 140 may include a processing device, such as a processor, and a memory. The processing device executes computer instructions stored in the memory, such as to implement one or more processes of the subject supply knowledge portal system. In one or more examples, the computer instructions may be stored on a non-transitory computer-readable medium. In one or more embodiments, a medication dispensing device and a waste device may be combined in a single point-of-use device.

The network 130 may be a public communication network (such as the Internet, cellular data network, dialup modems over a telephone network) or a private communications network (such as private local area network ("LAN"), leased lines). The network 130 may also include, but is not limited to, any one or more of the following network topologies, including a bus network, a star network, a ring network, a mesh network, a star-bus network, a tree or hierarchical network, and the like. The connections may be wired or wireless.

In one example, the database server 110 and/or the web server 120 may be single computing devices such as computer servers and/or the database server 110 and the web server 120 may be a single machine. In another example, the database server 110 and/or the web server 120 may represent one or more separate computing devices (such as a cloud of computers and/or a distributed system) that are communicatively coupled, such as communicatively coupled over the network 130, that collectively, or individually, perform one or more server-side functions. In this example, the one or more computing devices of the database server 110 and/or the web server 120 may be geographically collocated and/or disparately located. The database server 110 and/or web server 120 may be coupled with various databases, storage services, or other computing devices.

In one or more embodiments, the database server 110 includes a processing device 112 and a data store 114. The processing device 112 executes computer instructions stored in the data store 114, such as to implement one or more processes of the subject supply knowledge system. In one or more examples, the data store 114 may store the computer instructions on a non-transitory computer-readable medium. In one or more embodiments, the web server 120 includes a processing device 122 and a data store 124. The processing device 122 executes computer instructions stored in the data store 124, such as to implement one or more processes of the supply knowledge portal system. In one or more examples, the data store 124 may store the computer instructions on a non-transitory computer-readable medium. In one or more embodiments, the database server 110 and/or the web server 120 may be, or may include, the electronic system 8000 discussed below with respect to FIG. 11.

In operation, one or more of the point-of-use devices 140 may implement one or more aspects of the subject supply knowledge portal system, such as by providing data associated with transactions, items, events, or the like at the device to database server 110. In addition, the database server 110 may implement one or more aspects of the supply knowledge portal system, such as by performing one or more of the example processes that are discussed further below with respect to FIGS. 5-10.

Figure 2:
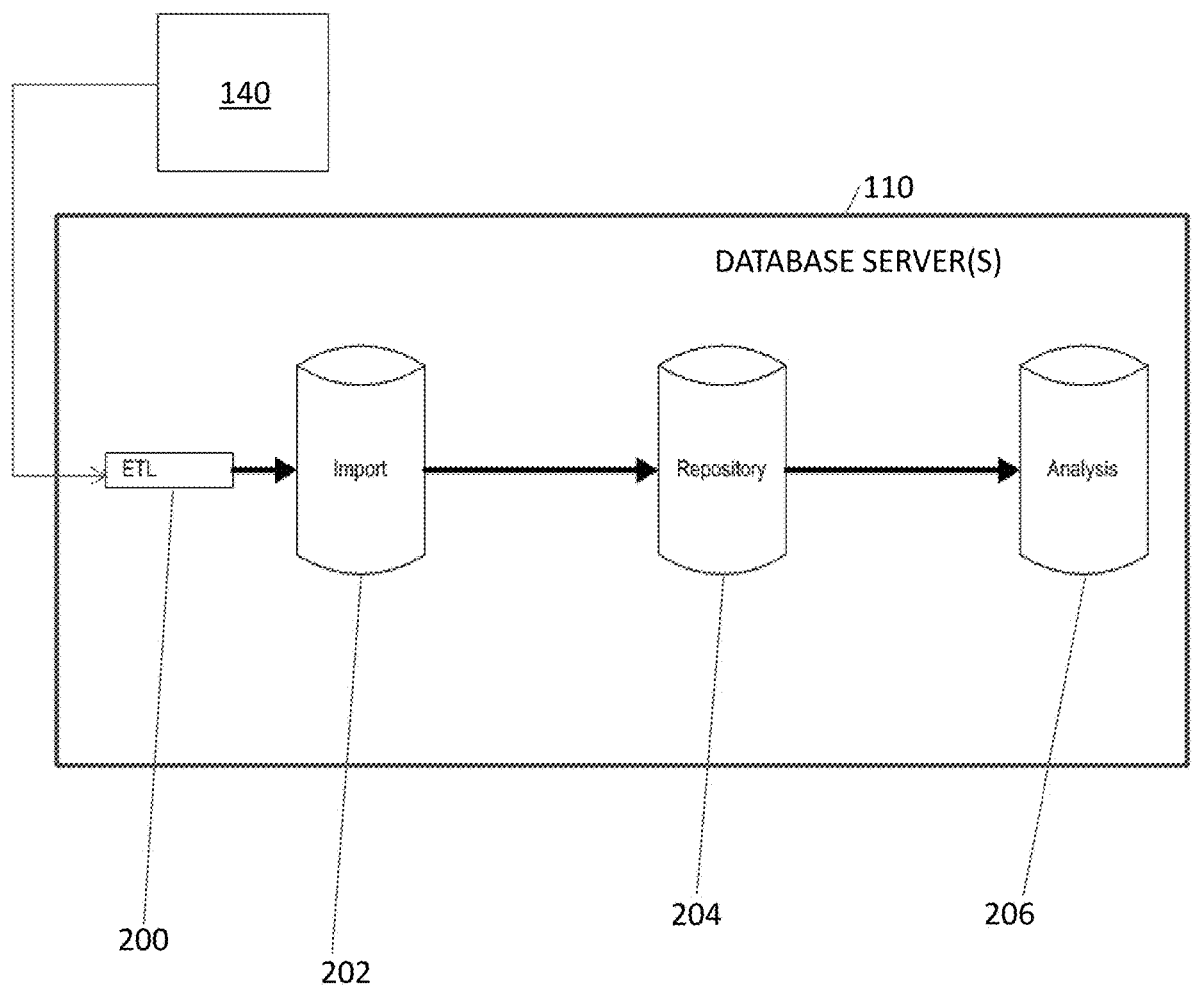
FIG. 2 illustrates an example database server in accordance with one or more aspects of the disclosure.

FIG. 2 is a block diagram illustrating an exemplary database server architecture for database server(s) 110. As shown in FIG. 2, database server(s) 110 may include an extract, transform, and load (ETL) engine 200 that receives raw data from point-of-use devices 140. ETL engine 200 may collect data such as text-based data in various formats from various devices and extract useful information, transform the useful information to a data format for database server(s) 110, and load the extracted, transformed, information into import database 202.

As shown in FIG. 2, database server(s) 110 also include a repository database 204 in which the raw data in import database 202 is transformed to track changes in the data and build relationships between transactions and/or aspects thereof. Database(s) 110 also include analysis database 206 that, using the transformed data in repository database 204, generates metric data for various metrics (see, e.g., Table 1 below). Analysis database 206 generates the metric data by transforming relational data from repository database 204 by aggregating the relational data to form summation data, and then transforming the summation data by performing various slicing operations across time, scope, and dimensional levels to generate data structures that arrange one or more values for each metric such that the values can be easily and efficiently stored, accessed, and updated to allow exploration of current metric data by a user operating UI 170.

It should be appreciated that each of databases 202, 204, and 206 may include memory (e.g., non-transitory machine readable media), one or more processors, and instructions or code stored thereon for processing the data stored therein and/or received from another of the databases and/or ETL engine 200.

Figure 3:
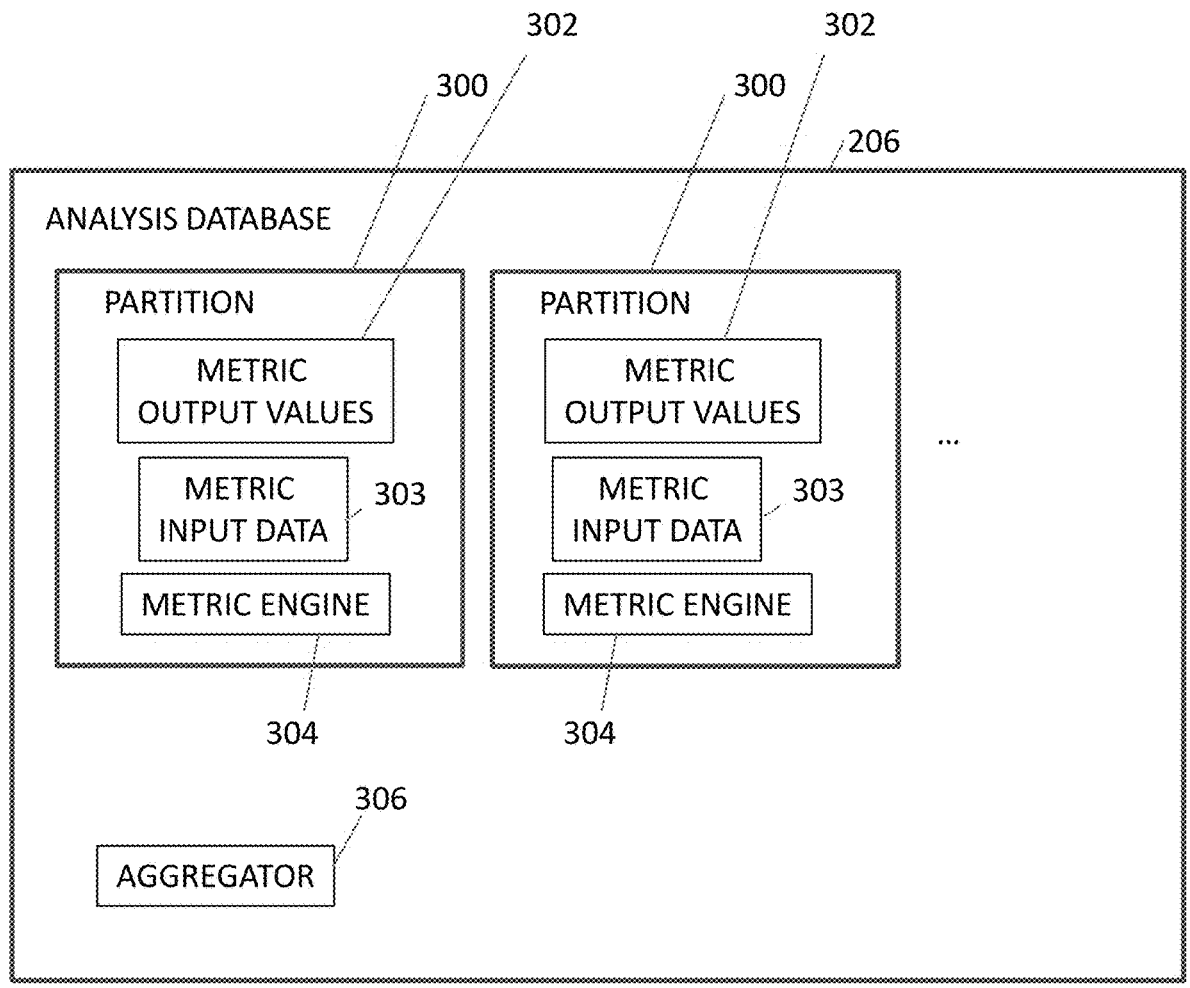
FIG. 3 illustrates an example analysis database in accordance with one or more aspects of the disclosure.

FIG. 3 shows how analysis database 206 in particular may include multiple partitions 300 (e.g., each corresponding to a particular metric). As shown, each partition 300 may include a metric engine 304 that generates metric output values 302 based on metric input data 303 stored at that partition. Metric input data 303 in a particular partition and for a particular metric may include any data from repository database 204 that is used for computation of the metric output values 302 of that metric. The metric input data 303 on the various partitions may include different and/or overlapping information. For example, as can be seen in, for example, FIG. 7 below, an item unit cost may be input data for a supply usage metric and an inventory-to-par metric and can thus be separately stored in each partition 300 for the separate computations of the separate metrics.

Metric output values 302 may be stored in the partition in which they are generated and/or provided to a common storage area for access via UI 170. Metric output values 302 for each metric may include one or more individual values that are provided to a data structure outside the partition for user access via UI 170 and/or may be stored in tables such as multidimensional metric tables for that metric in the partition or in a common storage area. A multidimensional metric table for a particular metric may include values of that metric at various granularities in various rows and/or sorted by various criteria in various rows or columns. Data structures that may be used for access to various of the metric output values 302 are described in further detail hereinafter in connection with, for example, FIG. 6. For example, dimensional data structure tables can provide flags and/or other indicators of the locations of various metric output values 302 (e.g., in multidimensional tables) in each partition 300 and/or in a common storage area. Examples of metrics are listed below in Table 1.

Each engine 304 may pull metric input data 303 from repository database 204 (e.g., including specific data for that metric and/or separate copies of the same data that is used to compute multiple metrics) and/or may be provided with summation data generated by aggregator 306 as metric input data 303 to be used in the computations performed by that engine, on that partition. Accordingly, for example, an item unit cost for a particular item may be obtained and used separately as metric input data 303 by separate engines 304 on separate partitions 300 in parallel computations of separate metric output value 302. Metric output values 302 may be stored in the partition on which they are generated (e.g., as shown in FIG. 3) or, after generation, can be stored in a common location for access via UI 170 and/or further modified to form efficiently accessible data structures (see, e.g., FIG. 6) for access via the UI 170.

Aggregator 306 may generate the summation data by transforming relational data from repository database 204 by aggregating the relational data to form the summation data.

The pre-calculation, storage arrangement, and partitioned computation of metric output values 302 facilitate efficient and fast updating of, access to, an exploration of the data associated with each particular metric, as desired by an end user operating UI 170 of the supply knowledge portal. The parallel computation of metric output values 302 on a separate partition for each metric speeds and provides flexibility for the pre-calculation of values and incorporation of new data such that the individual metric output values 302 can be computed in a commercially viable time frame (e.g., while the data is still relevant from a supply chain standpoint), and some metrics can be updated without disrupting other metrics. Metric output values 302 may be updated using new data received from point-of-use devices 140 periodically (e.g., once per day or every 2-3 hours or at longer or shorter periods) and independently of user requests for data, so that pre-calculated metric values are already updated and ready for quick access by the user.

Figure 4A:
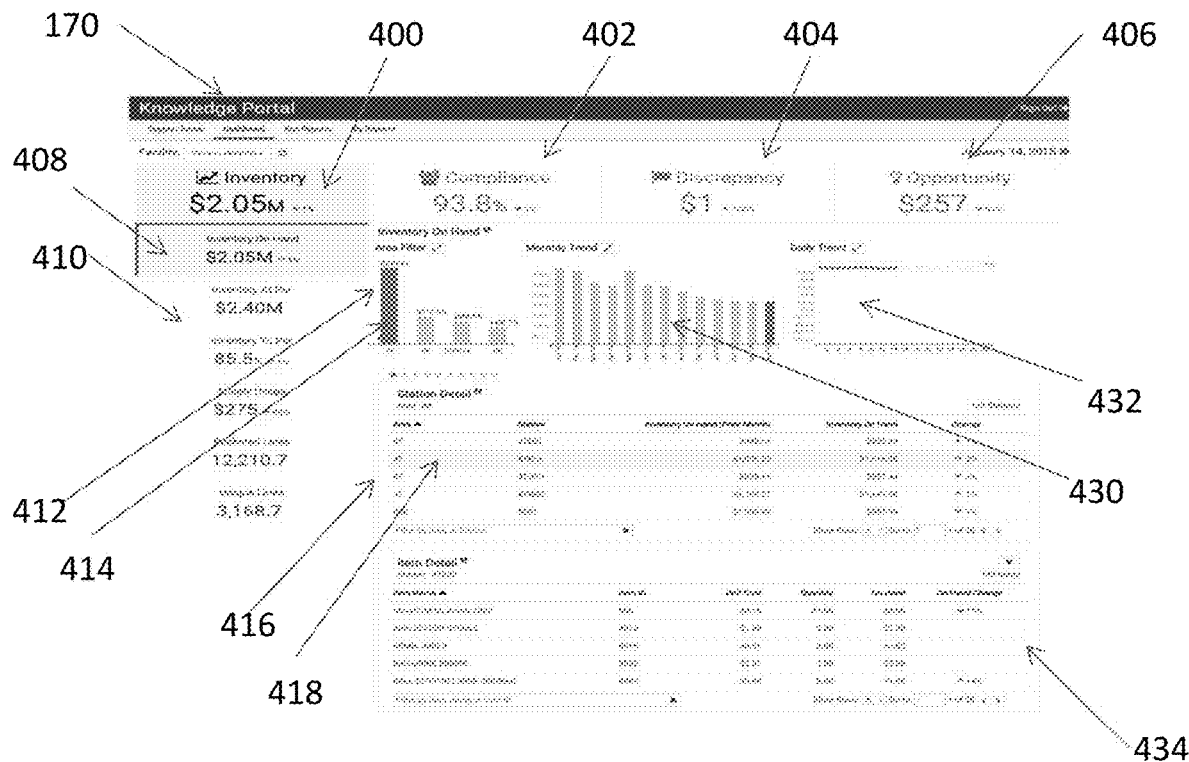
FIG. 4A illustrates an exemplary user interface view of a supply knowledge portal in accordance with one or more aspects of the disclosure.
Figure 4B:
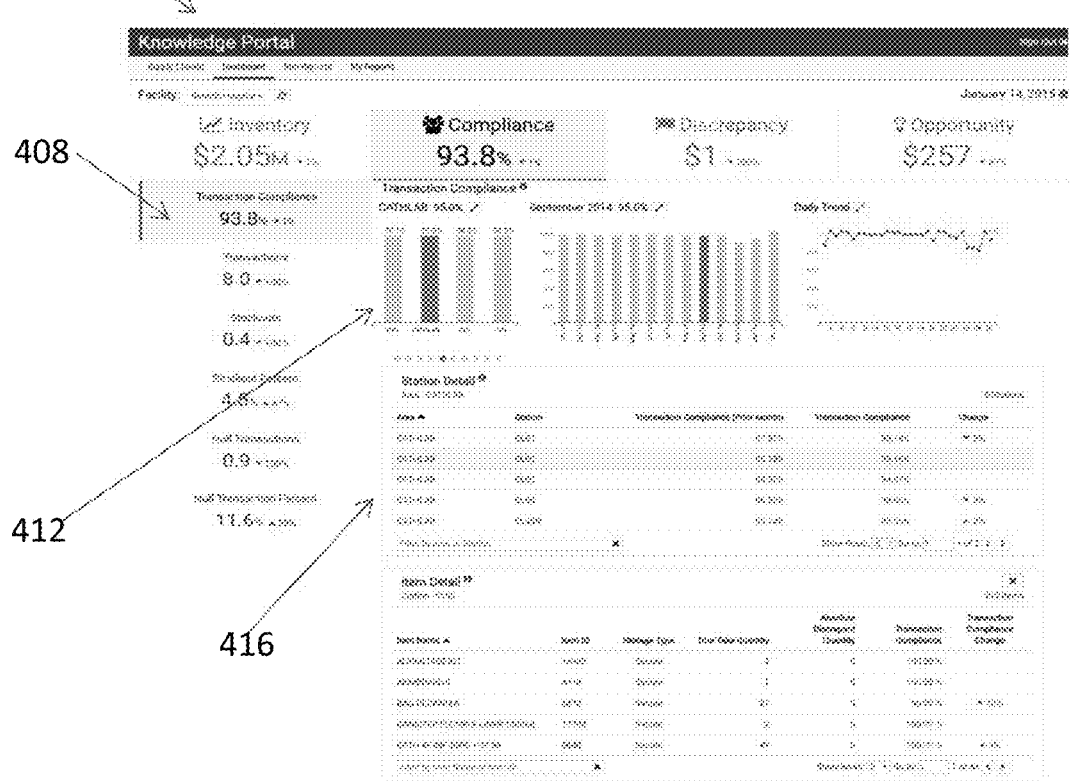
FIG. 4B illustrates another exemplary user interface view of a supply knowledge portal in accordance with one or more aspects of the disclosure.

FIGS. 4A and 4B show two example views that may be provided by user interface 170, using metric output values 302 stored by analysis database 206. As shown in FIG. 4A, UI 170 may provide a dashboard that allows end users to view data at various levels starting at the facility level and moving down to filter for specific areas, devices and, at the lowest level, items.

Each element may be displayed in the dashboard with a visual indicator to show the change (e.g., a month over month change) with a color or other indicator such as a chevron color indicating either improvement or regression from the previous month along with the percentage change. The end user can identify problem areas based on these indicators and can drill down to the lower levels by clicking or otherwise selecting various elements of UI 170 to determine what has caused the change.

The dashboard also provides graphical views of the data over time (e.g., a monthly trend graphical view 430 such as a monthly trend over the past 13 months to enable year over year comparison and a daily plot 432 of the metric data to identify spikes and troughs within the current month).

As shown in FIG. 4A, the dashboard is highly focused on the operational areas of the supply chain with categories 400, 402, 404, and 406 each including metrics relevant to that category. In the examples of FIGS. 4A and 4B categories 400, 402, 404, and 406 are respectively, provided for current inventory, user compliance, transactional discrepancies, and opportunities user compliance. In the example of FIG. 4A, the dashboard provided by UI 170 includes categories: Inventory (400), Compliance (402), Discrepancy (404), and Opportunity (406). Each category has their own set of metrics relating to that category. The categories 400, 402, 404, and 406 themselves are buttons to switch between these categories. For example, a user viewing the UI view of FIG. 4A for inventory category 400 that clicks on the category 402 will be provided with the view of FIG. 4B for the compliance category.

As shown in FIGS. 4A and 4B, various metrics are displayed within each category. In these examples, each category contains the title of the category, a facility's month-to-date daily average calculated metric, and a metric for the percent change of this daily average from last month's daily average. The metrics within each category are also clickable such that a user of the metric dashboard can navigate between various detail pages relating to each metric as the system accesses metric output values 302 that have been pre-computed by the analysis database. The metrics may also be hoverable to display additional data. As shown, additional metric data such as summary data 408 and 410 can be provided.

After a metric is selected, the user has the ability to drill deeper into that metric's data. Most categories and/or metrics follow the same pattern of containing an area filter graph 412, monthly trend graph 430, daily trend graph 432, station details 416, and item details 434. These sections may be referred to as "widgets." Each widget may refresh the data of the others when an item is selected from the widget.

Some categories and/or metrics may deviate from this pattern by providing more, less, or different data.

As shown, the Area Filter 412 may default to "All" Areas when the metric is first selected. The user may click on an area bar 414 or label for an area in order to filter the other widgets on that area. The Area Filter also provides a graph and raw values pertaining to that area and the metric selected.

The Area Filter will filter Monthly Trend 430, Daily Trend 432, and Station Details 416. Item Detail 434 will be removed when the user changes areas.

Monthly Trend 430 may default to the most recent month loaded with data. The user may click on a bar or label to change the other widgets' month value being examined.

Monthly Trend 430 will affect Area Filter 412, Daily Trend 432, Station Details 416, and Item Details 434. Unlike Area Filter 412, Item detail 434 persists through month changing.

Clicking the icons shown above either the Monthly Trend 430 or Area Filter 412 may display a Month and Area enlarged view.

Unlike the other widgets, Daily Trend 432 may not drive any other widgets. Daily Trend graph 432 provides the raw values being used to calculate the Daily Average of the month and area selected. Daily Trend data points can be hovered over to display a tooltip and the raw number for that day.

Station Detail 416 may default to showing all stations 418 in the facility. This table may be paged. In the examples of FIGS. 4A and 4B, Station Detail 416 contains a filter box to filter on the current dataset being viewed. The filter box filters both Area and Station. There is also a Show Rows dropdown box that allows the user to increase the number of rows shown as well as a Go To box to jump straight to a page. The columns shown in FIGS. 4A and 4B are Area, Station, MetricName (Prior Month), MetricName, and Change, where Area is the Area Name, Station is the Station Name, MetricName (Prior Month) is the the selected metric's value for the previous month, MetricName is the the selected metric's value for the current month/month selected, and Change is the percent change between the prior month and the month selected.

The user can select a station to drill further into that station's Item Detail 434. Item Detail 434 may be hidden until the user selects a station. Item Detail may not always be named, Item Detail. Some metrics have User Detail, or Patient Detail. The column specifics that may be provided for various example metrics are shown in Table 1 below.

TABLE 1

Item Detail Columns for Various Metrics:

| Metric Name | Item Detail Columns | | | | |
|---|---|---|---|---|---|
| Inventory On Hand | Item Name | Unit Cost | Quantity | On Hand | On Hand Change |
| Inventory At Par | Item Name | Unit Cost | Par Level | At Par | At Par Change |
| Inventory To Par | Item Name | Unit Cost | Turns | To Par | To Par Change |
| Supply Usage | Item Name | Take Quantity | Return Quantity | Total Usage | Total Usage Change |

TABLE 1-continued

Item Detail Columns for Various Metrics:

| Metric Name | Item Detail Columns | | | | | |
|---|---|---|---|---|---|---|
| Pocketed Lines | Item Name | Unit Cost | Quantity | Door Bin | Change | |
| Unique Lines | Item Name | Unit Cost | Quantity | Door Bin | Change | |
| Transaction Compliance | Item Name | True Take Quantity | Storage Type | Absolute Discrepant Quantity | Transaction Compliance | Transaction Compliance Change |
| Transactions | Item Name | Unit Cost | Transactions | Transaction Change | | |
| Stockouts | Item Name | Stockout Percent | Storage Type | Stockouts | Transactions | Stockout Change |
| Stockout Percent | Item Name | Stockout Percent | Storage Type | Stockouts | Transactions | Stockout Percent Change |
| Null Transactions (User Detail) | User Name | Null Transaction Percent | Null Transactions | Transactions | Null Transaction Change | |
| Null Transaction Percent (User Detail) | User Name | Null Transaction Percent | Null Transactions | Transactions | Null Transaction Percent Change | |
| Absolute Discrepancy Cost | Item Name | Storage Type | Unit Cost | Absolute Discrepant Quantity | Absolute Discrepant Cost | Absolute Discrepant Cost Change |
| Absolute Discrepancies | Item Name | Storage Type | Unit Cost | Absolute Discrepant Quantity | Absolute Discrepancies | Absolute Discrepancies Change |
| Overage Cost | Item Name | Storage Type | Unit Cost | Overage Quantity | Overage Cost | Overage Cost Change |
| Overages | Item Name | Storage Type | Unit Cost | Overage Quantity | Overages | Overages Change |
| Shortage Cost | Item Name | Storage Type | Unit Cost | Shortage Quantity | Shortage Cost | Shortage Cost Change |
| Shortages | Item Name | | Unit Cost | Shortage Quantity | Shortages | Shortages Change |
| Potential Savings | No Item Detail | | | | | |
| Unused Item Cost | Item Name | Unit Cost | Quantity | Unused Item Cost | Days Unused | |
| Unused Items | Item Name | Unit Cost | Quantity | Unused Item Cost | Days Unused | |
| Unreconciled Patient Cost (Patient Detail) | Patient Name | Patient ID | Admit Date | Charged Item Quantity | Total Cost | |
| Unreconciled Patients (Patient Detail) | Patient Name | Patient ID | Created By User | Admit Date | Hours Left | Unreconciled Cost |
| Floorstock Cost | Item Name | Chargeable Flag | Unit Cost | Charged Qty | Total Cost | Total Cost Change |
| Waste Cost | Item Name | Discard Quantity | Expired Quantity | Discard Cost | Expired Cost | Waste Cost Change |

In the example of FIGS. 4A and 4B, Item Detail 434 also has a filter box for filtering on Item/User/Patient Name only. Item Detail 434 also has a show rows dropdown and a go to box similar to Station Detail 416. While the other widgets are Daily Averages, Item Detail may be a Monthly Sum (e.g., a running total).

In accordance with various aspects, a Potential Savings metric may be provided that has no item detail. In accordance with various aspects, an Unreconciled Patients metric replaces Monthly Graph with Patient Graph. Patient Graph displays the number of temporary patients that fall into each "Hour bucket" depending on the patients "Hours Left" until the patient can no longer be reconciled (72 hours). When selected, the station detail widget is filtered to show stations with patients that fall into that "bucket."

In accordance with various aspects, Unreconciled Patients Station Detail contains different columns such as Area (Area Name), Station (Station Name), Unreconciled Patient Cost (Running total of item cost charged to temp patients), Charged Items (Running total of item quantity charged to temp patients), Unreconciled Patients (Number of unreconciled patients currently), and Hours Left (Minimum hours left until a patient is not longer reconcilable at this station). For example, if three patients are at a station with 72, 48, and 12 hours left, this column will show 12 hours left. In accordance with various aspects, Unreconciled Patients does not show monthly percent change nor a metric tooltip due to the nature of the metric (Not Historical). This metric also may not contain a Daily Graph due to the nature of the metric.

In accordance with various aspects, Null Transaction and Null Transaction Percent metrics may show User Detail instead of Item Detail. In accordance with various aspects, Unreconciled Patients and Unreconciled Patient Cost show Patient Detail instead of Item Detail.

In accordance with various aspects, the metric dashboard saves a user's Area, Month, and Station selection when changing metrics. The Station and Item filters may also be preserved when changing metrics. In cases where there is no Month or Area graph (e.g., for Unreconciled Patients), the metric dashboard may clear all selections and reset to All Areas and/or the Current month and clear the Station selected when clicking on this metric. When the user changes station, the item detail may persist the item filter for easy analysis across stations. However if the user changes areas, it can not be guaranteed that the station selected falls within the new area selected and thus, the station selection will be cleared. A "Close" button in item detail may also be provided to clear the current station selected.

A reset button by the facility selector may be provided to clear all selections and filters and reset the dashboard back to the initial metric. Double-Clicking on the already-selected metric a second time may clear all selections and filters, but keep the current metric selected for easy resetting (e.g., instead of resetting to the initial metric like the reset button).

The opportunity category 406 provides data and metrics that highlight areas of note that could help a hospital or hospital system improve their supply chain efficiency and financial performance.

As described above in connection with FIG. 3, database server(s) 110 may be associated with three databases 202, 204, and 206, each with a specialized function in cleaning, organizing, and tracking dimensional changes.

Figure 5:
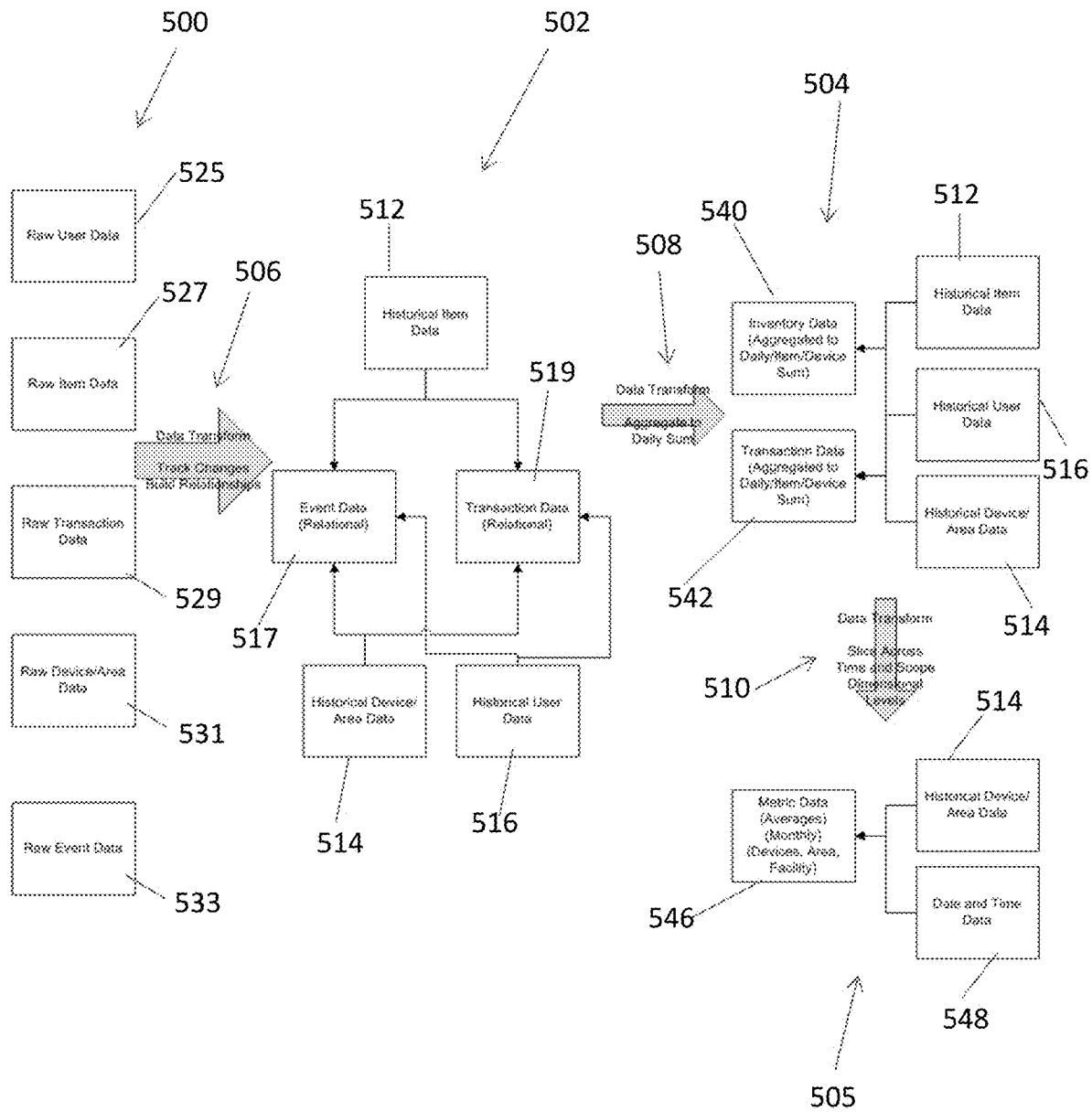
FIG. 5 illustrates a flow diagram of an example process for generation of metric data in an analysis database based on input data from a network of point-of-use devices in accordance with one or more aspects of the disclosure.

FIG. 5 illustrates a flow diagram showing data 500 that may be stored by import database 202, a data flow 502 for operations performed at repository database 204, and data flows 504 and 505 that may be performed at analysis database 206 to generate metric data 546 (e.g., which may be implemented as metric output values 302 of FIG. 3).

As shown in FIG. 5, data 500 may include raw user data 525, raw item data 527, raw transaction data 529, raw device/area data 531, and/or raw event data 533. Data 500 may be received, for example, from a network of point-of-use devices 140. Data 500 may represent information associated with ongoing transactions such as use or restocking of items from a controlled access device, and/or item-specific data such as item cost changes that affect many transactions. As shown, data transform operations 506 may be performed (e.g., by repository database 204) to track changes and build relationships between the raw data 500.

For example, repository database 204 may combine historical item data 512 with historical device/area data 514 and/or historical user data 516 as shown in FIG. 5 to generate relational event data 517 and relational transaction data 519. Repository database operations 506 may be performed as an intermediary process to organize the data in a logical structure before aggregation by aggregator 306 of FIG. 3. Relational event data 517 and relational transaction data 519 may be used for transactional reports for a user. However, the metric dashboard of UI 170 (see, e.g., FIGS. 4A and 4B) utilizes analysis database structures generated by transform operations 508 and 510 and as described in further detail hereinafter in connection with FIG. 6.

As shown in FIG. 5, a data transform operation 508 may be performed (e.g., by analysis database 206) to aggregate event data 517 and/or transaction data 519 (e.g., using data 512, 514, and/or 516) to generate summation data such as inventory data 540 and/or transaction data 542 (e.g., aggregated to daily item, and/or device sums). A data transform operation 510 may be performed (e.g., by each partition 300 of analysis database 206 for each metric shown in Table 1 and/or other metrics) to slice across time and scope dimensional levels to generate (e.g., from inventory data 540, transaction data 541, historical device/area data 514 and/or date and time data 548) metric data 546 such as the averages, monthly trends, device, area, and/or facility data described above in connection with FIGS. 4A and 4B and explorable using the data structures generated by operation 510.

Figure 6:
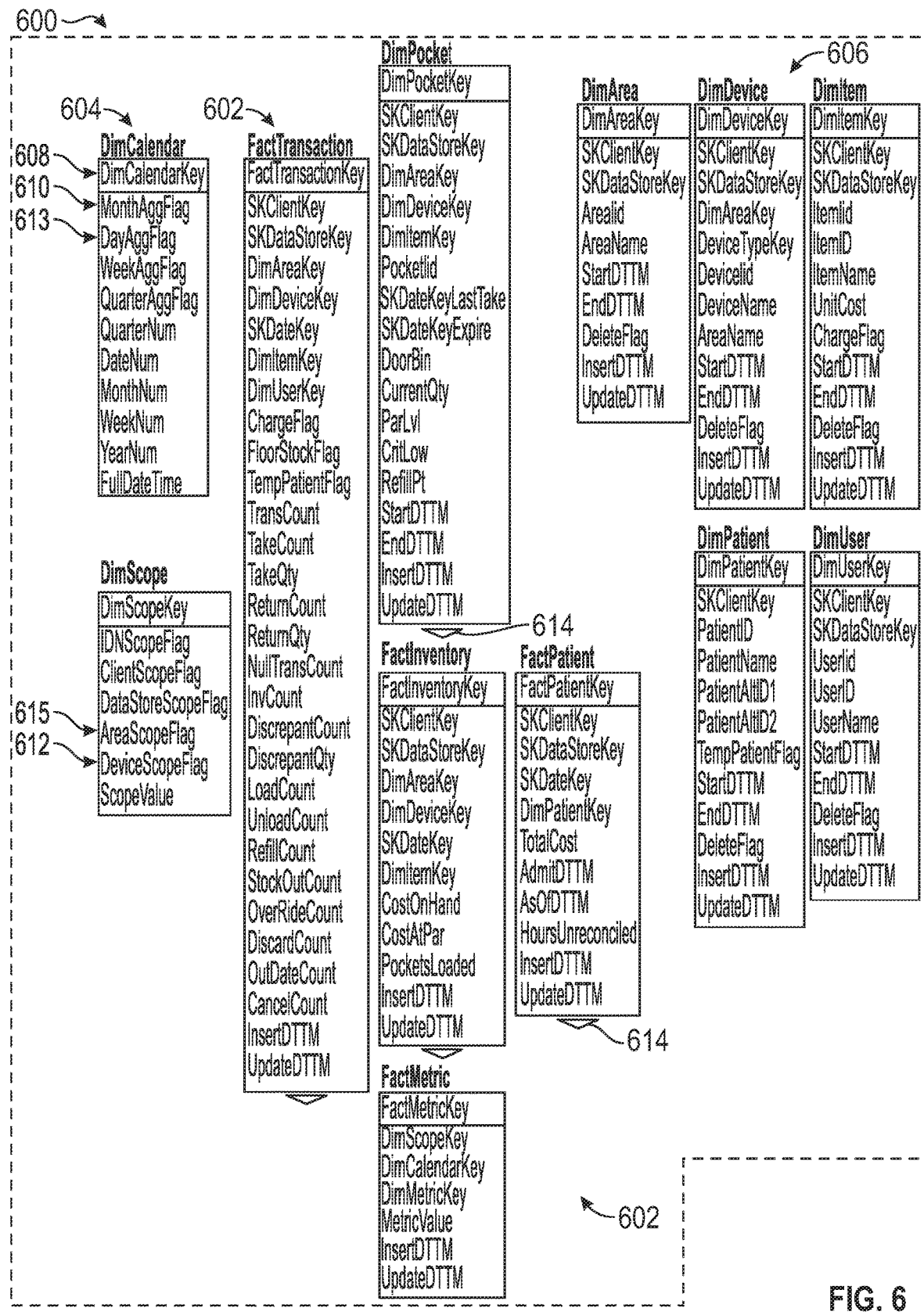
FIG. 6 illustrates exemplary data structures of an analysis database in accordance with one or more aspects of the disclosure.

FIG. 6 illustrates details of the data structures 600 of the analysis database 206. For efficiency of storage and access, the dimensions of the metric output values 302 can be stacked into fact tables 602 and dimensional (dim) tables 604 and 606 as shown.

In the example of FIG. 6, arrows 614 describe the flow of data, from top fact tables 602 to bottom fact tables 602 (e.g., FactMetric). In the example of FIG. 6, the fact tables FactTransaction, FactInventory, and FactPatient, and the dim tables 606 on the right hand side make up a first data structure in the analysis database. The FactMetric table, and dim tables 604 at the left (e.g., DimCalendar, and DimScope tables) make up a second data structure in the analysis database. Each table has an associated key 608.

In this example, DimCalendar and DimScope are used with FactMetric in order to store different granularities within the same table. Setting one of the flags in the DimCalendar and DimScope tables during querying at the UI 170 tells the data structure what level of data is being requested. For example, to get a monthly device level of granularity (e.g., as seen in the UI's Station Detail 416 above), the DimCalendar and DimScope tables are joined to FactMetric. The DeviceScopeFlag 612 in DimScope is set to true, and the MonthAggFlag 610 in DimCalendar is set to true. In this way, UI 170 fetches Monthly Device granularity data from FactMetric table 602.

In another example, to get Daily Area granularity data (e.g., as seen in the UI's Daily Trend Graph 432 above), the tables are joined as noted above and then DayAggFlag 613 is set to true, and AreaScopeFlag 615 is set to true in the query.

In the UI 170, Category and Left hand Metric data corresponds to Client and Month Granularity, Area Filter Graph corresponds to Area and Month Granularity, Monthly Trend Graph corresponds to Facility or Area and Month Granularity, Daily Trend corresponds to Facility or Area and Day Granularity, and Station Detail corresponds to Device and Month Granularity.

UI 170 may be used to query for the data from both of the data structures within the analysis database 206. Higher Level data on the UI 170 queries, for example, lower elements in the Data Structure 600 displayed in FIG. 6 in the analysis database. For example, item level detail is queried from the first analysis data structure.

FIGS. 7, 8, 9, and 10 respectively illustrate data flows for generating, by analysis database 206, various metric values corresponding to various metrics in Table 1 above.

Figure 7:
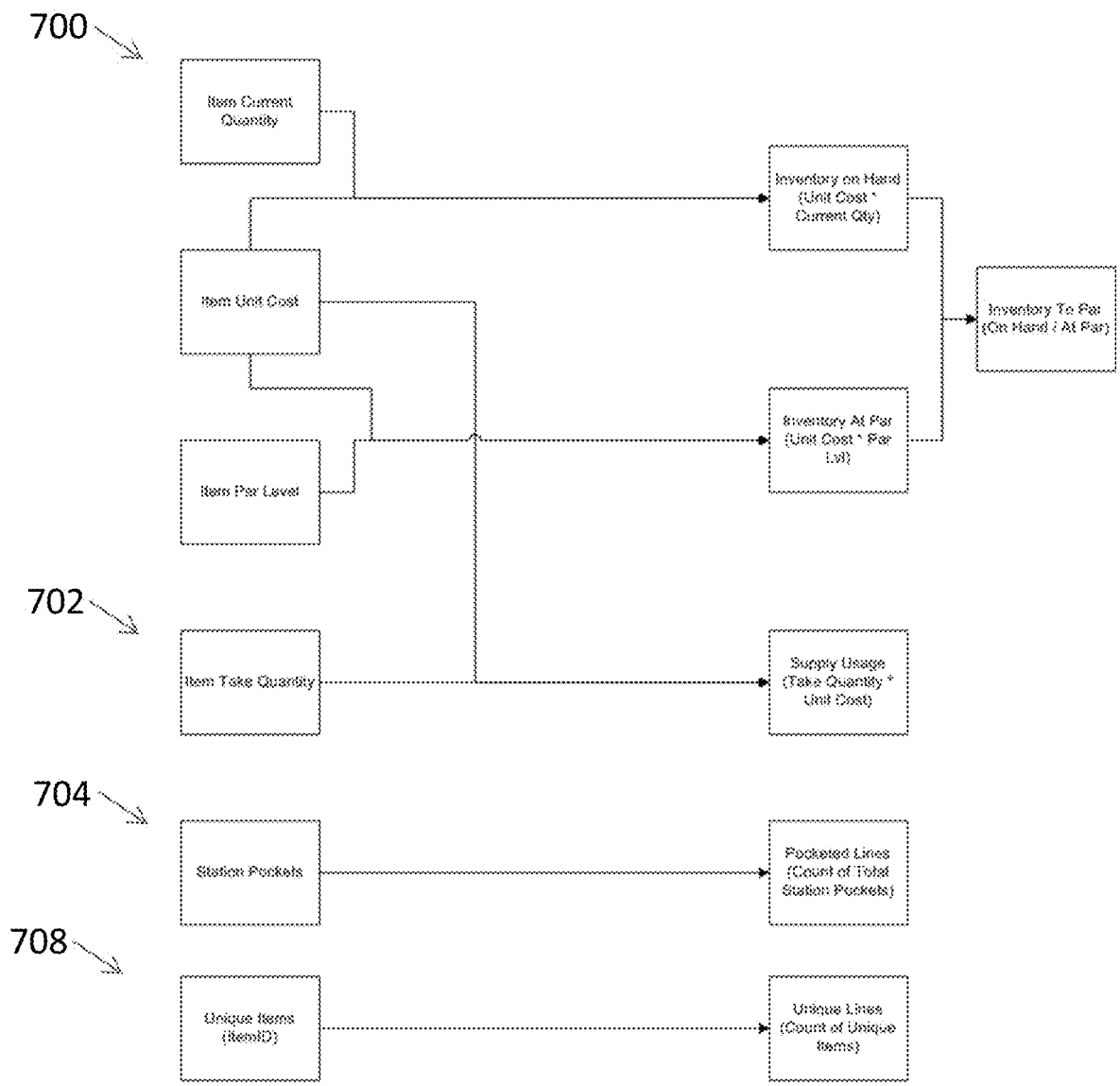
FIG. 7 illustrates exemplary flow diagrams of example processes for generation of inventory metric data for a supply knowledge portal in accordance with one or more aspects of the disclosure.
Figure 8:
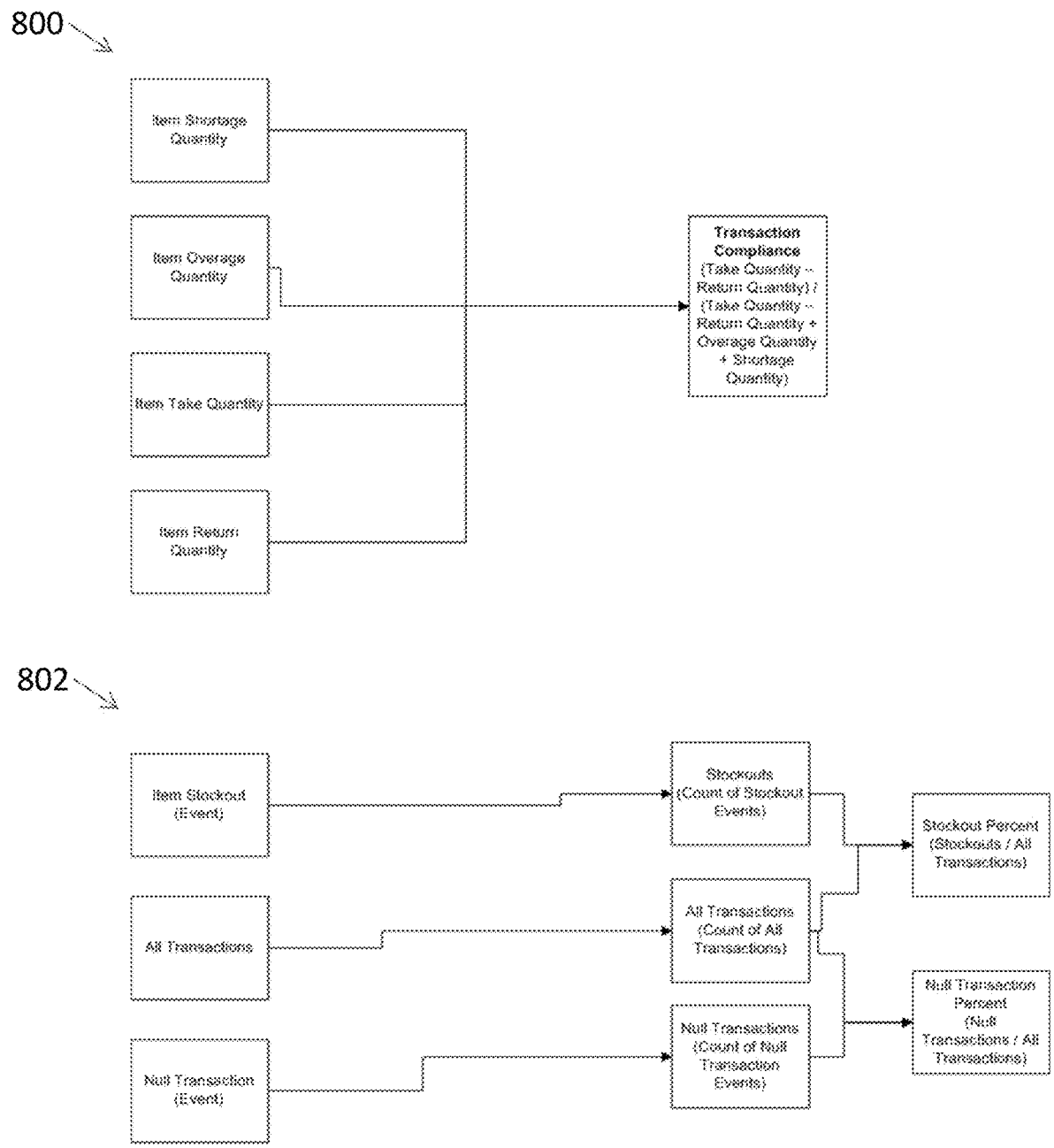
FIG. 8 illustrates exemplary flow diagrams of example processes for generation of compliance metric data for a supply knowledge portal in accordance with one or more aspects of the disclosure.

For example, FIG. 7 illustrates data flows 700, 702, 704, and 708 for respectively generating inventory metrics "Inventor to Par", "Supply Usage", "Pocketed Lines", and "Unique Lines". FIG. 8 illustrates data flows 800 and 802 for respectively generating compliance metrics "Transaction Compliance" and "Stockout Percent" and "Null Transaction Percent".

Figure 9:
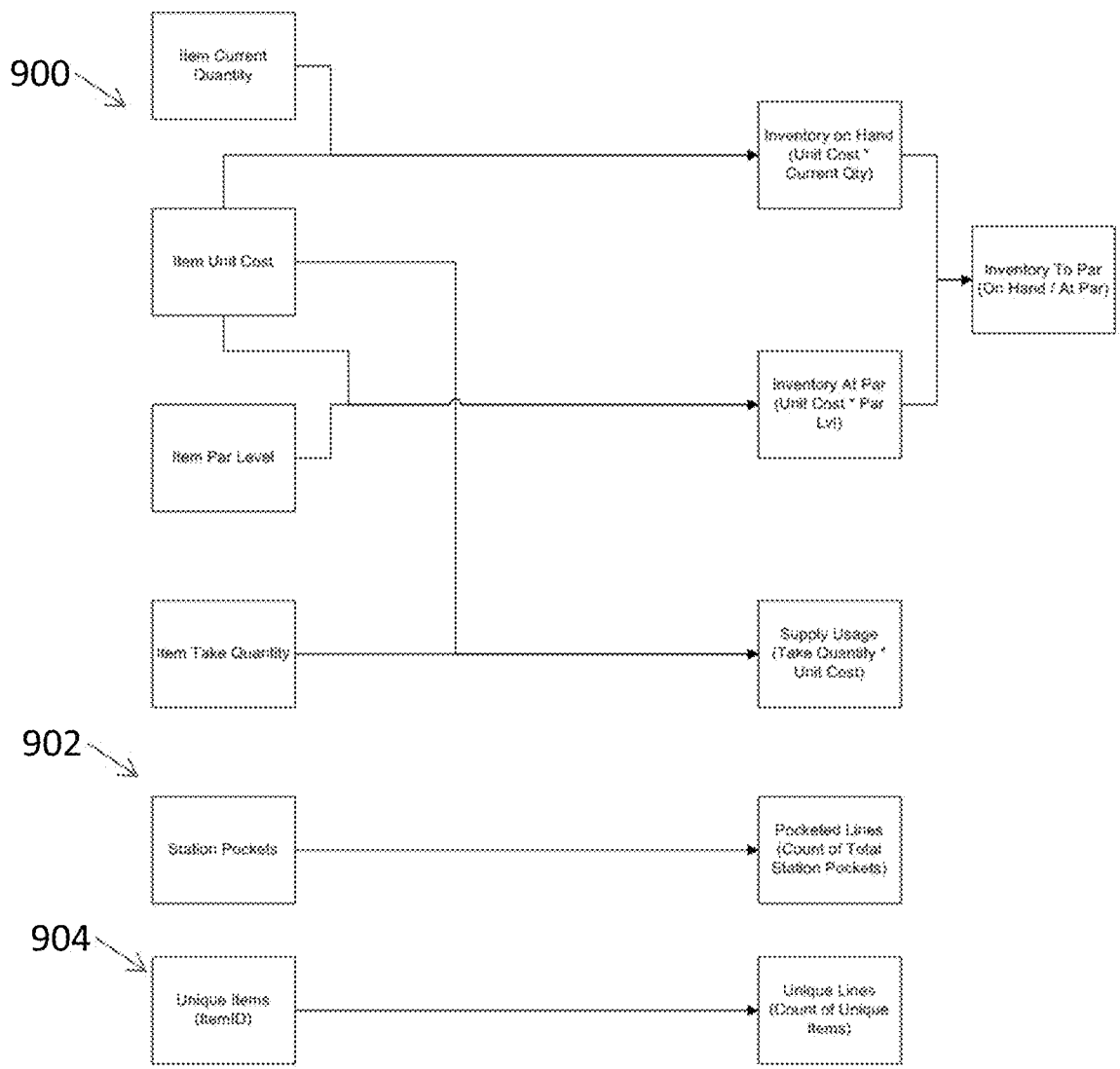
FIG. 9 illustrates exemplary flow diagrams of example processes for generation of discrepancy metric data for a supply knowledge portal in accordance with one or more aspects of the disclosure.
Figure 10:
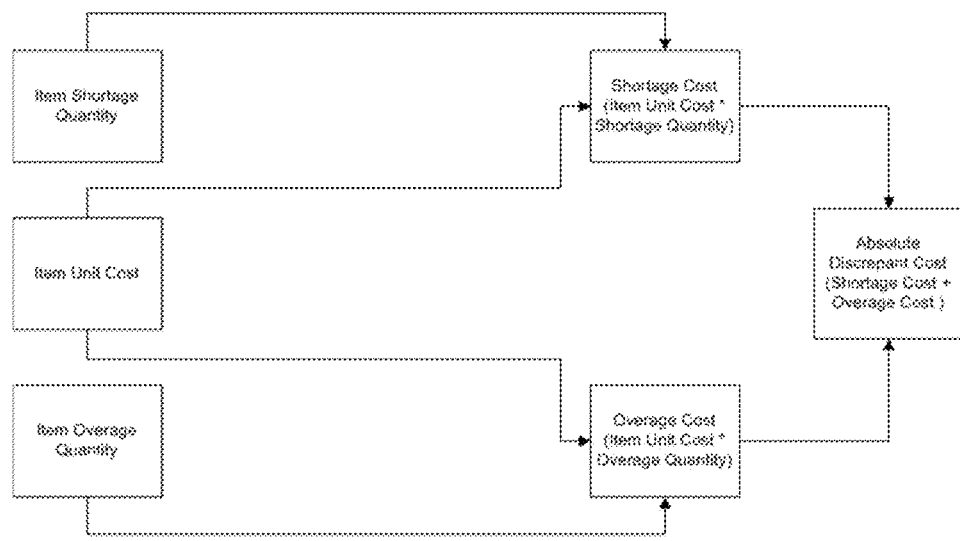
FIG. 10 illustrates exemplary flow diagrams of example processes for generation of opportunity metric data for a supply knowledge portal in accordance with one or more aspects of the disclosure.
Figure 10:
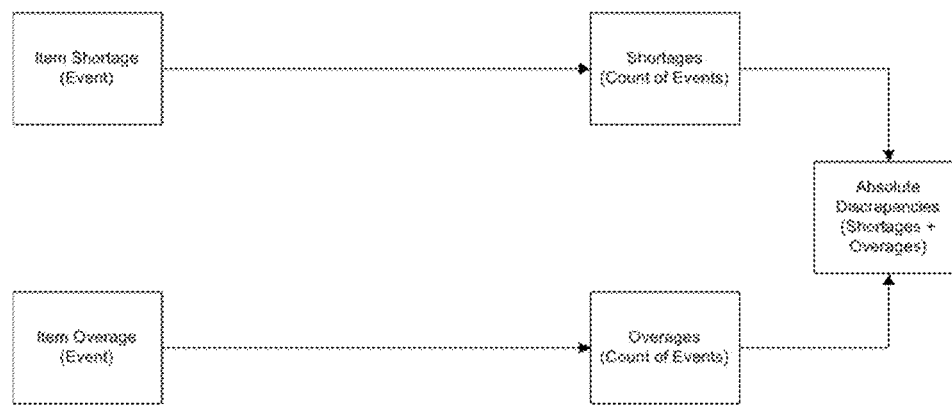

FIG. 9 illustrates data flows 900, 902, and 904 for respectively generating Discrepancy Metrics "Inventory to Par" and "Supply Using", "Pocketed Lines", and "Unique Lines", FIG. 10 illustrates data flows 1000 and 1002 respectively for generating Opportunity Metrics "Absolute Discrepancy Cost" and "Absolute Discrepancies".

It should be appreciated that, although a single analysis database 206 is shown in FIG. 3, system 100 may be expandable by sharding of database server 110. For example, the import-repository-analysis configuration of database 110 of FIG. 3 can be expanded by cloning of the database.

Figure 11:
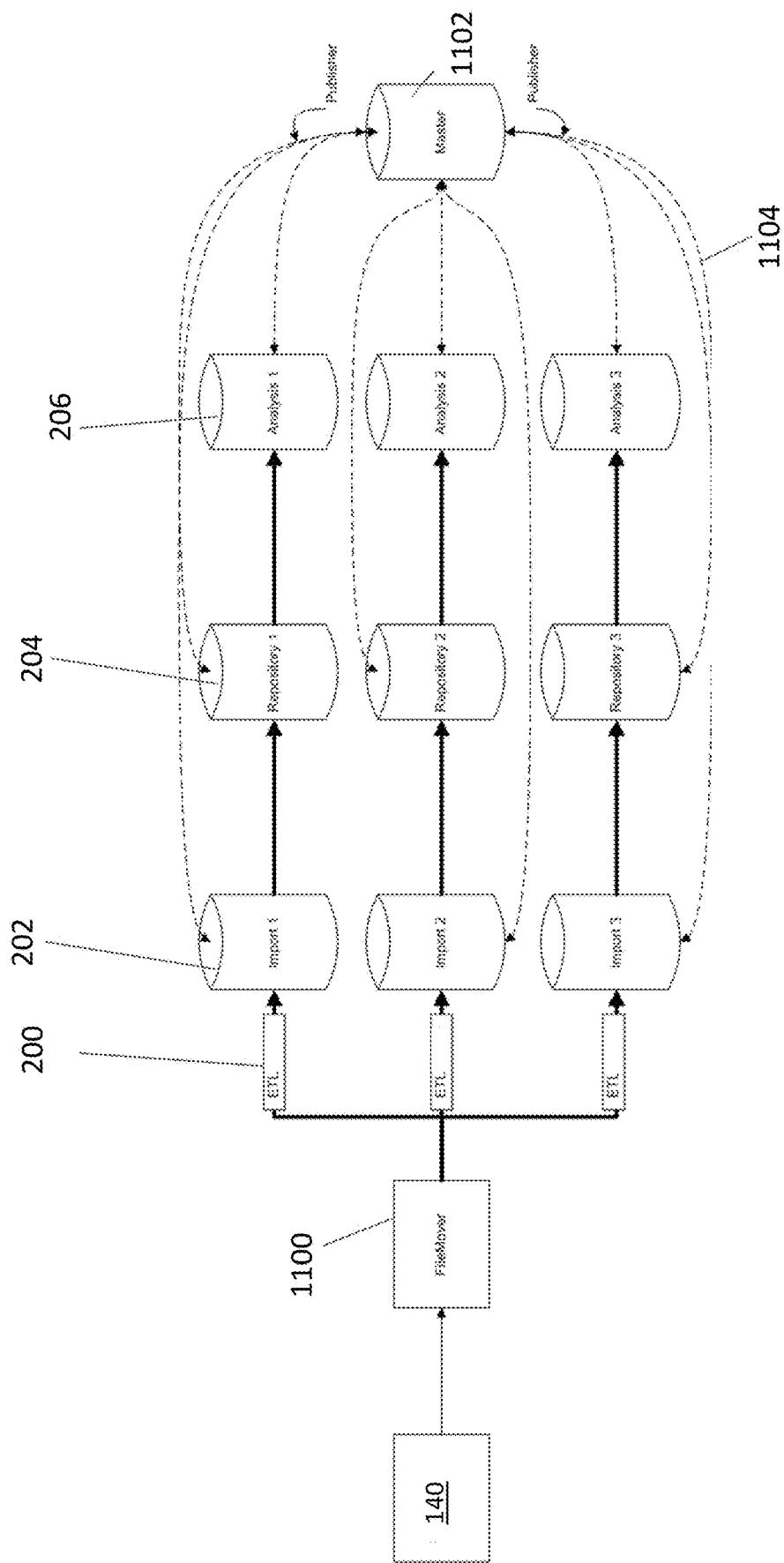
FIG. 11 illustrates a block diagram of a sharded database in accordance with one or more aspects of the disclosure.

FIG. 11 illustrates an example of a sharded database 110 having multiple shards (each with an ETL engine 200, an import database 202, a repository database 204, and an analysis database 206). In the example of FIG. 11, multiple ETL threads can be run in parallel, one with each shard, using a master database 1102. Commonly used tables can be stored in master database 1102 in order to sync the shards together. ETL and reports may be shard-aware. Shard-aware consists of querying master database 1102 for the correct shard (e.g., for a client based on an identifier for the client). In addition, a common FileMover (e.g., SSIS) package 1100 may be provided to precede the ETL engines 200 of the shards, in order to correctly place incoming batch files to the shard that houses a particular client's data. A Publisher (e.g., SSIS) package 1104 may also be provided as shown in FIG. 11, in order to sync lookup data as well as other commonly used data by the ETL.

Figure 12:
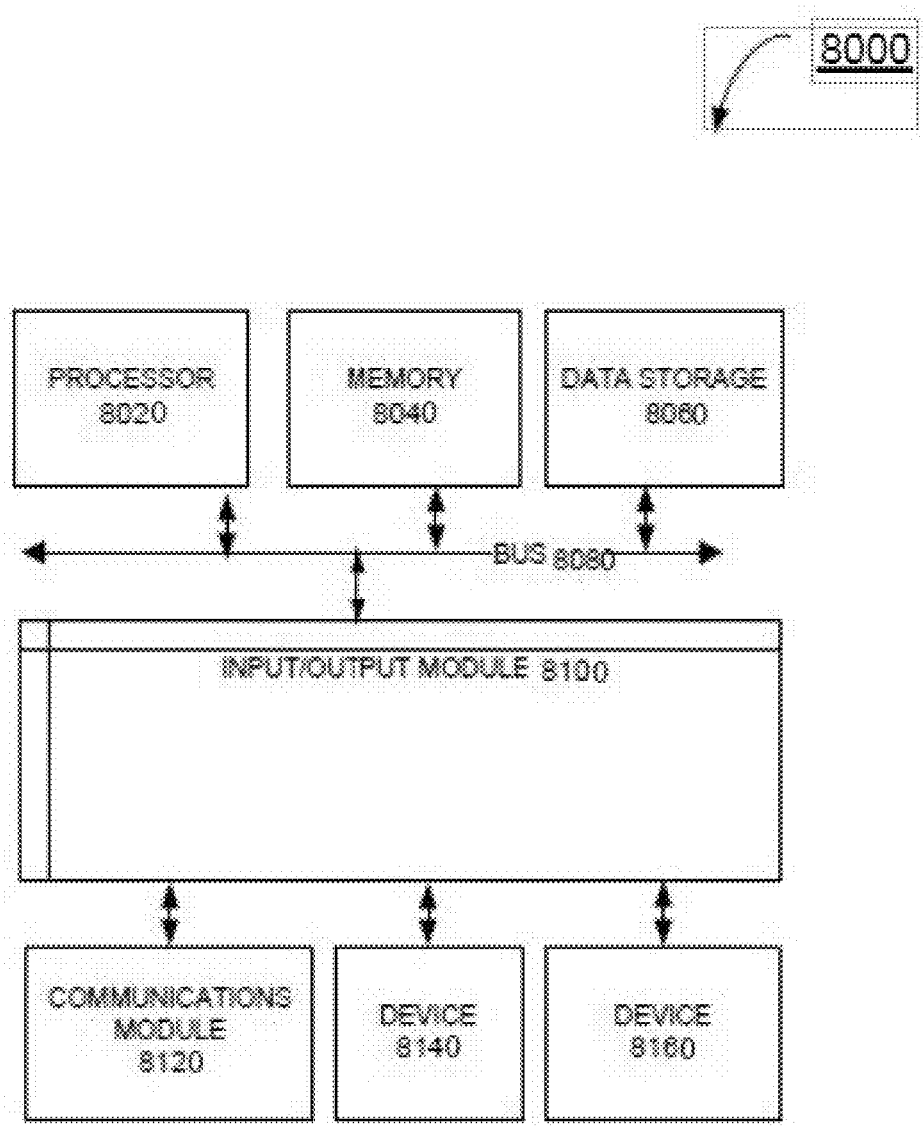
FIG. 12 illustrates a block diagram of an electronic system with which one or more aspects of the subject technology may be implemented.

FIG. 12 illustrates a block diagram of an electronic system 8000 with which one or more aspects of the subject technology may be implemented. Electronic system 8000, for example, can be a point-of-use device 140, a database server 110 or web server 120, a client device 150, a desktop computer, a laptop computer, a tablet computer, a phone, a personal digital assistant (PDA), or generally any electronic device that transmits signals over a network (e.g., time clocks, proximity badges, biometric identification schemes, supply chain data, transaction data, item data, and the like). Such an electronic system includes various types of computer readable media and interfaces for various other types of computer readable media. Electronic system 8000 includes bus 8080, processing unit(s) 8120, system memory 8040, read-only memory (ROM) 8100, permanent storage device 8020, input device interface 8140, output device interface 8060, and network interface 8160, or subsets and variations thereof.

Bus 8080 collectively represents all system, peripheral, and chipset buses that communicatively connect the numerous internal devices of electronic system 8000. In one or more embodiments, bus 8080 communicatively connects processing unit(s) 8120 with ROM 8100, system memory 8040, and permanent storage device 8020. From these various memory units, processing unit(s) 8120 retrieves instructions to execute and data to process in order to execute the processes of the subject disclosure. The processing unit(s) can be a single processor or a multi-core processor in different embodiments.

ROM 8100 stores static data and instructions that are needed by processing unit(s) 8012 and other modules of the electronic system. Permanent storage device 8020, on the other hand, is a read-and-write memory device. This device is a non-volatile memory unit that stores instructions and data even when electronic system 8000 is off. One or more embodiments of the subject disclosure use a mass-storage device (such as a magnetic or optical disk and its corresponding disk drive) as permanent storage device 8020.

Other embodiments use a removable storage device (such as a floppy disk, flash drive, and its corresponding disk drive) as permanent storage device 8020. Like permanent storage device 8020, system memory 8040 is a read-and-write memory device. However, unlike storage device 8020, system memory 8040 is a volatile read-and-write memory, such as random access memory. System memory 8040 stores any of the instructions and data that processing unit(s) 8120 needs at runtime. In one or more embodiments, the processes of the subject disclosure are stored in system memory 8040, permanent storage device 8020, and/or ROM 8100. From these various memory units, processing unit(s) 8120 retrieves instructions to execute and data to process in order to execute the processes of one or more embodiments.

Bus 8080 also connects to input and output device interfaces 8140 and 8060. Input device interface 8140 enables a user to communicate information and select commands to the electronic system. Input devices used with input device interface 8140 include, for example, alphanumeric keyboards and pointing devices (also called "cursor control devices"). Output device interface 8060 enables, for example, the display of images generated by electronic system 8000. Output devices used with output device interface 8006 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more embodiments may include devices that function as both input and output devices, such as a touchscreen. In these embodiments, feedback provided to the user can be any form of sensory feedback, such as visual feedback, auditory feedback, or tactile feedback; and input from the user can be received in any form, including acoustic, speech, or tactile input.

Also as shown in FIG. 12, bus 8080 also couples electronic system 8000 to a network (not shown) through network interface 8160. In this manner, the computer can be a part of a network of computers (such as a local area network ("LAN"), a wide area network ("WAN"), or an Intranet, or a network of networks, such as the Internet. Any or all components of electronic system 8000 can be used in conjunction with the subject disclosure.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs; any other optical or magnetic media, and floppy disks. In one or more embodiments, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more embodiments, the computer readable media is non-transitory computer readable media, computer readable storage media, or non-transitory computer readable storage media.

In one or more embodiments, a computer program product (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

The subject technology is illustrated, for example, according to various aspects described above. Various examples of these aspects are described as numbered concepts or clauses (1, 2, 3, etc.) for convenience. These concepts or clauses are provided as examples and do not limit the subject technology. It is noted that any of the dependent concepts may be combined in any combination with each other or one or more other independent concepts, to form an independent concept. The following is a non-limiting summary of some concepts presented herein:

Concept 1. A system, comprising
a database server;
one or more point-of-use devices in a hospital supply chain, each configured to provide controlled access to medical items and to provide information associated with the medical items to the database server via a network;
wherein the database server comprises a memory that stores at least one metric value for a plurality of metrics for the hospital supply chain, wherein the at least one metric value for each metric is generated, based on at least a portion of the information associated with the medical items, at a corresponding partition of an analysis database of the database server; and
a web server configured to facilitate user access to the stored metric values via a metric dashboard of a user interface.

Concept 2. The system of Concept 1 or any other Concept, wherein the metric dashboard includes a displayed metric value for each of a plurality of categories, and provides clickable access to additional metric values in each category.

Concept 3. The system of Concept 2 or any other Concept, wherein the plurality of categories comprise an inventory category, a compliance category, a discrepancy category, and an opportunity category.

Concept 4. The system of Concept 3 or any other Concept, wherein the displayed metric value for the inventory category comprises at least one of a month-to-date daily average value, an area filter value, a monthly trend value, a daily trend value, a station detail value, or an item detail value.

Concept 5. The system of Concept 4 or any other Concept, wherein the displayed metric value is clickable or hoverable to provide additional metric values associated with the displayed metric value.

Concept 6. The system of Concept 4 or any other Concept, wherein the displayed metric value is displayed with a chevron color indicating either improvement or regression of the displayed metric value from a previous month.

Concept 7. The system of Concept 1 or any other Concept, wherein the database server is configured to update the at least one metric value for at least one of the plurality of metrics, upon receipt of new information from the one or more point-of-use devices, using a metric engine in the partition corresponding to that metric.

Concept 8. The system of Concept 7 or any other Concept, wherein the database server comprises an import database and a repository database, wherein the import database is configured to store the new information from the one or more point-of-use devices, and wherein the repository database is configured to track changes in the information from the one or more point-of-use devices to generate and store relational data associated with transactions and events at the one or more point-of-use devices.

Concept 9. The system of Concept 8 or any other Concept, wherein the analysis database comprises an aggregator configured to aggregate the relational data in the repository database to generate summation data.

Concept 10. The system of Concept 9 or any other Concept, wherein the metric engine is configured to update the at least one metric value for at least one of the plurality of metrics by performing a plurality of slices of the summation data across time and scope.

Concept 11. The system of Concept 7 or any other Concept, the database server is configured to update the at least one metric value for a plurality of other ones of the plurality of metrics, upon the receipt of the new information from the one or more point-of-use devices, using a plurality of other metric engines in the partitions corresponding to the plurality of other ones of the plurality of metrics.

Concept 12. The system of Concept 7 or any other Concept, wherein the analysis database is configured to periodically update the at least one metric value for the at least one of the plurality of metrics independently of user access requests via the metric dashboard.

Concept 13. The system of Concept 1 or any other Concept, wherein the analysis database comprises a plurality of data structures each including at least one table storing one or more of the metric values and at least one dimensional table that facilitates access, to the at least one table in that data structure, by the metric dashboard.

Concept 14. The system of Concept 1 or any other Concept, wherein the database server comprises is a sharded database.

Concept 15. The system of Concept 14 or any other Concept, wherein the sharded database includes a first shard comprising the analysis database, and at least one additional share including an additional analysis database.

Concept 16. A method, comprising
tracking, with one or more point-of-use devices in a hospital supply chain, controlled access events associated with medical items;
providing information associated with the medical items to a database server via a network;
generating at least one metric value for a plurality of metrics for the hospital supply chain, based on at least a portion of the information associated with the medical items, at a corresponding partition of an analysis database of the database server; and providing, with a web server, user access to the at least one metric value for the plurality of metrics via a metric dashboard of a user interface.

Concept 17. The method of Concept 16 or any other Concept, further comprising updating the at least one metric value for at least one of the plurality of metrics, upon receipt of new information from the one or more point-of-use devices, using a metric engine in the partition corresponding to that metric.

Concept 18. The method of Concept 16 or any other Concept, wherein the metric dashboard displays a metric value for each of a plurality of categories, and provides clickable access to additional metric values in each category.

Concept 19. The method of Concept 18 or any other Concept, wherein the plurality of categories comprise an inventory category, a compliance category, a discrepancy category, and an opportunity category.

Concept 20. A database server associated with at least one hospital, the database server comprising:

an import database storing information from a plurality of point-of-use devices in a hospital supply chain;

a repository database storing, relational data associated with the information from the plurality of point-of-use devices; and an analysis database comprising a plurality of partitions, each configured to compute a metric of the hospital supply chain using the relational data in the repository database to provide efficient access to the metric via a metric dashboard provided at a user device that is remote from the database server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A system, comprising
a database server;
a plurality of medication dispensing devices in a hospital supply chain, each medication dispensing device comprising a processor and being configured to control user access to medical items stored within the medication dispensing device, and each medication dispensing device being configured to provide information associated with the medical items stored within the medication dispensing device to the database server via a network,
wherein the database server comprises a memory that stores metric values for a plurality of metrics for the hospital supply chain, each metric of the plurality of metrics indicating, for a category or device or physical location, a relationship between a portion of the metric values and a period of time, wherein the database server includes multiple partitions with each partition storing metric values for a respective metric and that are generated based on input information stored in the partition for the respective metric, at least one metric value being generated, based on at least a portion of the information associated with medical items stored within a respective medication dispensing device;
wherein the database server is configured to:
receive use data from the one or more of the medication dispensing devices, the use data including data related to restocking items for the plurality of medication dispensing devices,
generate event data based on associating the use data with historical data,
aggregate the event data to generate, for the plurality of metrics, daily summation data for transactions performed at the one or more medication dispensing devices;
and
a web server configured to:
provide for display by a client device, remote from the web server, a user interface comprising a metric dashboard; and
cause the user interface to display the plurality of metrics and metric values based on the daily summation data, including data elements arranged in the metric dashboard according to a respective physical facility location associated with the data elements, with one or more of the data elements each being displayed with a visual indicator that indicates, by a color of the visual indicator, whether a metric value associated with the data element improved on or regressed from a date prior to a current date.

2. The system of claim 1, wherein the metric dashboard includes a displayed metric value for each of a plurality of categories, and provides clickable access to additional metric values in each category, wherein the user interface is configured to, in response to a selection of a respective data element, cause a display of data associated with the respective physical facility location to change to a display of data associated with a geographical area or item within the physical facility location and which is representative of why the value of the respective data element improved or regressed.

3. The system of claim 2, wherein the plurality of categories comprise an inventory category, a compliance category, a discrepancy category, and an opportunity category.

4. The system of claim 3, wherein the displayed metric value for the inventory category comprises at least one of a month-to-date daily average value, an area filter value, a monthly trend value, a daily trend value, a station detail value, or an item detail value.

5. The system of claim 4, wherein the displayed metric value is clickable or hoverable to provide additional metric values associated with the displayed metric value.

6. The system of claim 4, wherein the displayed metric value is displayed with a chevron color indicating either improvement or regression of the displayed metric value from a previous month.

7. The system of claim 1, wherein the database server is configured to update the at least one metric value for at least one of the plurality of metrics, upon receipt of new information from one or more of the plurality of medication dispensing devices, using a metric engine in the partition corresponding to that metric.

8. The system of claim 7, wherein the database server comprises an import database and a repository database, wherein the import database is configured to store the new information from the one or more medication dispensing devices, and wherein the repository database is configured to track changes in the information from the one or more medication dispensing devices to generate and store relational data associated with transactions and events at the one or more medication dispensing devices.

9. The system of claim 8, wherein the database server comprises an aggregator configured to aggregate the relational data in the repository database to generate summation data.

10. The system of claim 9, wherein the metric engine is configured to update the at least one metric value for at least one of the plurality of metrics by performing a plurality of slices of the summation data across time and scope.

11. The system of claim 7, the database server is configured to update the at least one metric value for a plurality of other ones of the plurality of metrics, upon the receipt of the new information from the one or more medication dispensing devices, using a plurality of other metric engines in the partition corresponding to the plurality of other ones of the plurality of metrics.

12. The system of claim 7, wherein the database server is configured to periodically update the at least one metric value for the at least one of the plurality of metrics independently of user access requests via the metric dashboard.

13. The system of claim 1, wherein the database server comprises a plurality of data structures each including at least one table storing one or more of the metric values and at least one dimensional table that facilitates access, to the at least one table in that data structure, by the metric dashboard.

14. The system of claim 1, wherein the database server comprises is a sharded database.

15. The system of claim 14, wherein the sharded database includes a first shard comprising the database server, and at least one additional share including an additional analysis database.

16. A method, comprising
tracking, with a plurality of medication dispensing devices configured to control user access to medical items stored within the medication dispensing devices, controlled access events associated with the medical items stored within the medication dispensing devices, each medication dispensing device comprising a processor and configured to provide information associated with the medical items to a database server;
receiving information associated with the medical items by the database server via a network, the information including use data from the plurality of medication dispensing devices, the use data including data related to restocking items for the respective medication dispensing device, wherein the database server is configured to generate event data based on associating the use data with historical data, and aggregate the event data to generate daily summation data for transactions performed at the plurality of medication dispensing devices;
generating, by the database server, metric values for a plurality of metrics for a hospital supply chain, each metric of the plurality of metrics indicating, for a category or device or physical location, a relationship between a portion of the metric values and a period of time, wherein the database server includes multiple partitions with each partition storing metric values for a respective metric and that are generated based on input information stored in the partition for the respective metric, at least one metric value being generated, based on at least a portion of the information associated with medical items stored within a respective medication dispensing device; and
providing, with a web server, for display by a client device remote from the web server, a user interface comprising a metric dashboard including the plurality of metrics and metric values, and
wherein the user interface displays the at least one of the plurality of metrics and metric values based on the daily summation data, including data elements arranged in the metric dashboard according to a respective physical facility location associated with the data elements, with one or more of the data elements each being displayed with a visual indicator that indicates, by a color of the visual indicator, whether a metric value associated with the data element improved on or regressed from a date prior to a current date.

17. The method of claim 16, further comprising updating the at least one metric value for at least one of the plurality of metrics, upon receipt of new information from one or more of the plurality of medication dispensing devices, using a metric engine in the partition corresponding to that metric, wherein the method further comprises:
causing, in response to a selection of a respective data element, the user interface to change a display of data associated with the respective physical facility location to a display of data associated with a geographical area or item within the physical facility location and indicate why the value of the respective data element improved or regressed.

18. The method of claim 16, wherein the metric dashboard displays a metric value for each of a plurality of categories, and provides clickable access to additional metric values in each category.

19. The method of claim 18, wherein the plurality of categories comprise an inventory category, a compliance category, a discrepancy category, and an opportunity category.

20. A non-transitory computer readable medium having instructions stored thereon that, when executed by a computing device, cause the computing device to perform operations, comprising:
tracking, with one or more medication dispensing devices configured to control user access to medical items stored within the one or more dispensing devices, controlled access events associated with the medical items stored within the one or more dispensing devices, each medication dispensing device comprising a processor and configured to provide information associated with the medical items to a database server;
receiving information associated with the medical items by the database server via a network, the information including use data from a respective medication dispensing device of the one or more medication dispensing devices, the use data including data related to restocking items for the respective medication dispensing device, wherein the database server is configured to generate event data based on associating the use data with historical data, and aggregate the event data to generate daily summation data for transactions performed at the one or more medication dispensing devices;
generating metric values for a plurality of metrics for a hospital supply chain, each metric of the plurality of metrics indicating, for a category or device or physical location, a relationship between a portion of the metric values and a period of time, wherein the database server includes multiple partitions with each partition storing metric values for a respective metric and that are generated based on input information stored in the partition for the respective metric, at least one metric value being generated, based on at least a portion of the information associated with medical items stored within a respective medication dispensing device; and providing, with a web server, for display by a client device remote from the web server, a user interface comprising a metric dashboard including the plurality of metrics and metric values, and wherein the user interface displays the at least one of the plurality of metrics and metric values based on the daily summation data, including data elements arranged in the metric dashboard according to a respective physical facility location associated with the data elements, with one or more of the data elements each being displayed with a visual indicator that indicates, by a color of the visual indicator, whether a metric value associated with the data element improved on or regressed from a date prior to a current date.

\* \* \* \* \*